United States Patent [19]
Quan et al.

[11] Patent Number: 5,987,363
[45] Date of Patent: Nov. 16, 1999

[54] THREE-DIMENSIONAL REPRESENTATION OF A SPACECRAFT'S TRAJECTORY

[75] Inventors: Alan Quan; Cecilia Han-Chang; Ursula Schwuttke, all of Pasadena, Calif.

[73] Assignee: California Institute of Technology, Pasadena, Calif.

[21] Appl. No.: 08/824,738

[22] Filed: Mar. 26, 1997

Related U.S. Application Data

[60] Provisional application No. 60/014,104, Mar. 26, 1996.

[51] Int. Cl.⁶ ........................................ G06F 3/14
[52] U.S. Cl. ........................ 701/13; 701/201; 701/226
[58] Field of Search ........................... 701/1, 3, 4, 5, 701/13, 14, 200, 201, 207, 208, 211, 222, 226, 300

[56] References Cited

U.S. PATENT DOCUMENTS

| | | |
|---|---|---|
| 5,212,480 | 5/1993 | Ferro ........................................ 701/13 X |
| 5,473,746 | 12/1995 | Pritt et al. ............................ 701/226 X |

*Primary Examiner*—William A. Cuchlinski, Jr.
*Assistant Examiner*—Ed Pipala
*Attorney, Agent, or Firm*—Fish & Richardson P.C.

[57] ABSTRACT

A method and a computer system with a specialized graphic user interface for processing trajectory data of a spacecraft and planets. The preferred graphic user interface is capable of representing the orbital trajectory of the spacecraft traveling from one planet to another in 3D and providing user interactions to display the orbit information at any time and position.

7 Claims, 8 Drawing Sheets

THREE-DIMENSIONAL REPRESENTATION OF A SPACECRAFT'S TRAJECTORY

This application claims the benefit of the U.S. Provisional Application No. 60/014,104, filed on Mar. 26, 1996, the disclosure of which is incorporated herein by reference.

ORIGIN OF INVENTION

The invention described herein was made in the performance of work under a NASA-1260 contract, and is subject to the provisions of Public Law 96-517 (35 U.S.C. § 202) in which the Contractor has elected to retain title.

FIELD OF THE INVENTION

The present invention relates to a technique of displaying data in three dimensions and more specifically to a visualization tool and a computer system for simulating spacecraft trajectory data information in three dimensions.

BACKGROUND AND SUMMARY OF THE INVENTION

Computers can be used to present information in the form of images on a display device. An image, which the user can visualize, includes graphics, characters, words, and text as well as other display features such as colors. A display device that can display graphical output is called a graphical user interface ("GUI").

A GUI is a type of computer interface which allows accessing actual objects that a user can access and manipulate. The GUI provides a visual aid to assist the user to enter values as well as entering the various objects and attributes to create a graphical representation.

One type of graphical representation that is difficult to visualize is that of a three-dimensional space on a two-dimensional display device. The creation of three-dimensional space on a two-dimensional display device is known as 3D rendering. Resource intensive calculations are often necessary in order to render three dimensional space from a particular point of view. The calculations are more resource intensive with respect to viewing trajectories of celestial bodies and spacecraft (e.g., satellites) in three-dimensions. This is at least in part due to the complexity of the trajectories of the celestial bodies and spacecraft that is caused by the nature of multi-body interaction therebetween. Currently, personal computers usually cannot be utilized to view 3D graphic representation of space trajactories because a graphical user interface does not exist whereby a user is able to view and edit a spacecraft's trajectory in three-dimensions.

The inventors of the present invention recognized a need to create a tool that allows current GUIs to enable a user to visualize a spacecraft's trajectory as well as allow the user to edit and select the data they wish to view. Furthermore, the inventors recognized a need for real time rendering in determining the position and velocity of celestial bodies with respect to one another at some finite time interval. That is, they recognized a need for a tool which can calculate the trajectories of various objects, i.e., planets, satellites, spacecrafts, comets, asteroids, at a particular time interval.

Many exploratory spacecraft travel to various planets in our solar system. Most persons conceptualize the orbit line of the spacecraft as launched from Earth and traveling to the target destination in a straight line path. In actuality, a spacecraft orbits in the planet's gravitational pull around the Sun. The orbit of each planet is approximately an ellipse with the Sun as one of the focus points. A spacecraft usually escapes from a planet's gravitational pull by following a trajectory that is substantially parabolic. In this way, a spacecraft launched from the Earth travels in orbit around the Earth and then coasts either further from or closer to the Sun, depending upon its destination, until it crosses the orbit of the next planet. Therefore, the spacecraft's trajectory would appear substantially parabolic where the beginning point is where the spacecraft is launched from and the ending point is the final destination of the spacecraft.

For example, if a spacecraft was to travel from Earth to Jupiter, the spacecraft would not travel directly in a straight line between the two planets. Instead, the spacecraft is usually launched in the same direction that the Earth moves around the Sun. The spacecraft coasts outward from the Sun until it crosses an orbit into Mars and continues to orbit Mars until it escapes into Jupiter's orbit.

The inventors recognized that this path is completely counter-intuitive. The inventors recognized that what is needed, therefore, is a system and method for object selection and trajectory modification which provides visually intuitive and directly manipulable ways of editing the spacecraft's trajectory, on a GUI, in the context of real time.

The inventors of the present invention recognized a need for a tool that allows the GUI to display objects in three-dimensions, and draw each celestial body or satellite in its current location in space. This tool may be used for educating the general public on their perception of the spacecraft's trajectory. In accordance with the invention, a preferred GUI displays the relationship of each celestial body with respect to another body. A user may select to and from where they wish to view the three-dimensional trajectory for the objects whose ephemeris files are calculated. In addition, the user may flexibly and conveniently display and edit the trajectory to any date and time the user wishes to view.

The present embodiment generates a three-dimensional graphical representation of the environment, i.e., the user's perspective of a graphical universe including items such as a satellite's trajectory. Furthermore, the present invention displays trajectories of various objects in three-dimensions while permitting the user to edit the features by directly manipulating the data.

Accordingly, the inventors recognized a need in three-dimensional processing for real time three-dimensional rendering which allows a user to move the three-dimensional space in real time along any axis of a reference frame and which can further allow the user to view a satellite's trajectory on a personal computer system.

It is therefore an object of the present invention to provide an improved computerized method and apparatus for representing a three-dimensional view of space with celestial bodies and spacecrafts.

It is another object of the present invention to provide an improved method and apparatus for rendering a three-dimensional space on a two dimensional graphics display in real time.

It is yet another object of the present invention to allow a user to efficiently translate and rotate the viewing position along any axis.

It is yet another object of the present invention to visualize a three-dimensional representation of a spacecraft's trajectory.

It is yet another object of the present invention to provide an interactive computer system which allows a user to move the celestial bodies and spacecrafts forwards and backwards in time.

The present invention addresses these needs by a trajectory visualization tool that enables a user from a computer including a personal computer, to view a three-dimensional representation of a spacecraft's trajectory and the trajectories of any planets or spacecrafts of interest. The tool reads in two ephemeris files which include tables of the computed positions of celestial bodies and spacecrafts. One of these files is for the spacecraft and one is for the planets. The tool uses these to calculate the Cartesian coordinates of the objects and their trajectories. This information is then plotted and displayed on the GUI. Using a pointing device (e.g., a mouse), the user can manipulate a slider on the GUI to move the spacecraft and planets forward or backward in time to their relative positions at any point within the time span of the ephemeris file. This allows the user to visualize trajectory information.

This tool allows a user who is unfamiliar with celestial mechanics to grasp the details, complexities, and constraints of a spacecraft's trajectory.

Accordingly, there is provided an interactive computer system that reduces the time and skill-level to project a trajectory visualization tool that presents a three-dimensional picture of a spacecraft's trajectory and provides vital orbital information.

A preferred computer system for processing data of a spacecraft's trajectory comprises: first memory means for storing positioning and timing information of said spacecraft and a plurality of celestial bodies including the Earth and Sun; first data processing means for calculating ephemeris data of said spacecraft and said celestial bodies; an user interface for entering user option data on said spacecraft's trajectory, said user option data comprising launching location and time and landing location and time of said spacecraft; graphic processing means for rendering graphic representation of said ephemeris data of said spacecraft and said celestial bodies, said graphic rendition being dictated by said user option data; and a graphic display for displaying said spacecraft's trajectory.

BRIEF DESCRIPTION OF THE DRAWINGS

These and other advantages of the present invention will become more apparent in light of the following detailed description of a preferred embodiment thereof, as illustrated in the accompanying drawings, in which.

DETAILED DESCRIPTION OF THE INVENTION

Figure 1:
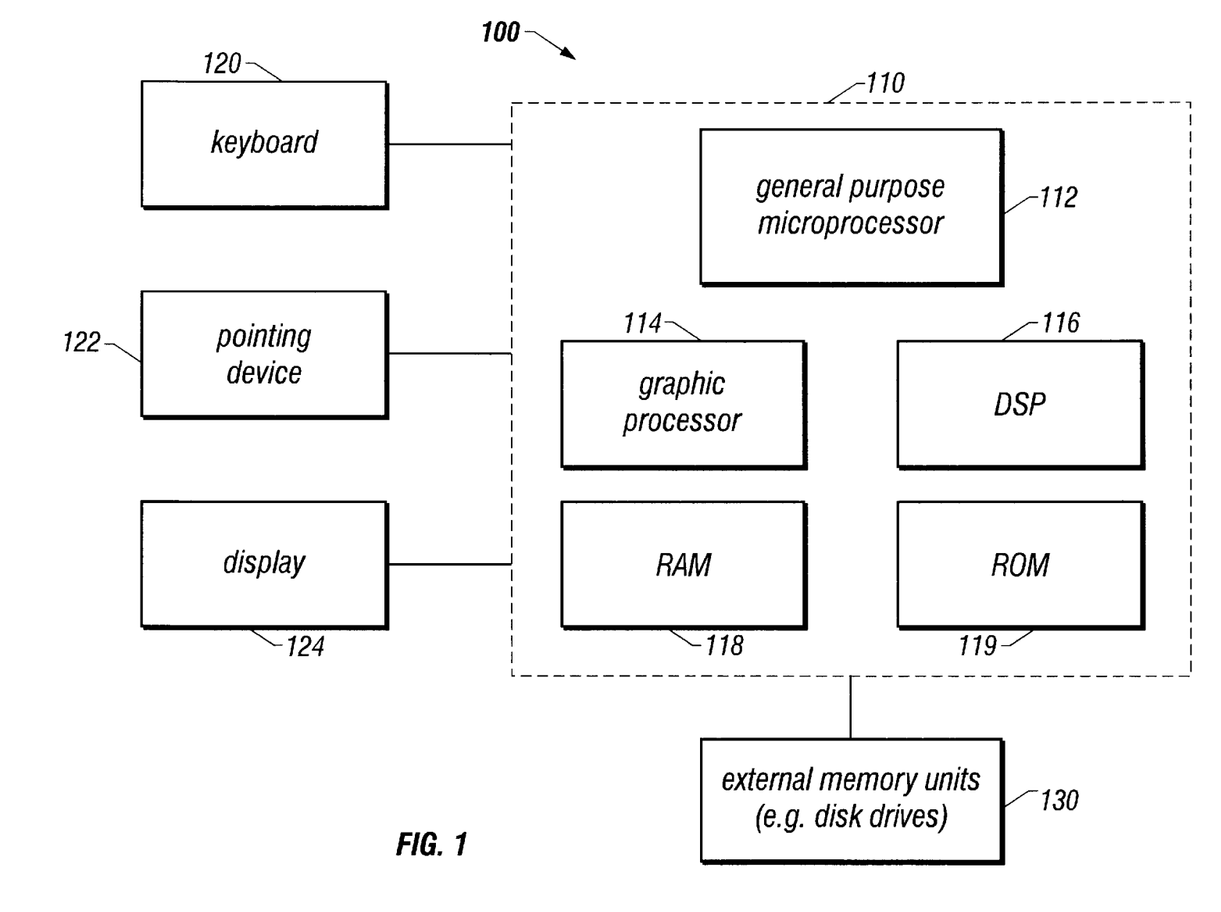
FIG. 1 is a block diagram showing the basic components of the hardware used in implementing the invention.

FIG. 1 shows the basic hardware required for implementing the preferred embodiment of the invention. A computer system 100 includes a central processing system 110, external memory units 130, I/O devices such as a video display 120 (preferably a high resolution color graphics display), a keyboard 122, and a pointing device 124. The central processing unit 110 comprises a general purpose microprocessor 112, a random access memory (RAM) 118, a read only memory (ROM) 119 for storing programs and data therein for processing by the microprocessor 112, a graphics processor 114 for performing rendering and low level graphics work to the video display 120 and a digital signal processor (DSP) 116. The DSP 116 performs position calculations and provides functions of video display such as translation and rotation. The external memory units 130 may include one or more disk drives for loading programs.

The present invention runs on the computer system 100 based on a pre-loaded program. This pre-loaded program includes information regarding the position of celestial bodies and spacecrafts (e.g., satellites) on various dates and times. The following describes how the invention determines the orbital positions of the satellite and celestial bodies.

One factor influencing the orbits of spacecrafts is the Earth's gravitational field. Taking this into account there exists fast, simple and fairly accurate algorithms wellknown in the art for computing the orbital positions of orbiting spacecrafts. Other known algorithms compute the positions of the Sun, moon and other planets. This invention makes use of these existing algorithms to compute the positions of a spacecraft including a satellite, Sun, moon and planets. For greater accuracy, the orbital positions are computed by more sophisticated algorithms or derived from other sources and stored in files called "ephemeris tables." The present invention preferably uses two ephemeris files, which are tables of the computed positions of the celestial bodies and satellites. The computer system 100 is loaded with a first file containing the satellite's data and a second file containing the celestial bodies' data. These files are input to the preferred computer system 100 and the orbital positions, at arbitrary elapsed times, are computed by standard interpolation techniques. a more detailed description of these files is provided in FIG. 2.

Figure 2A:
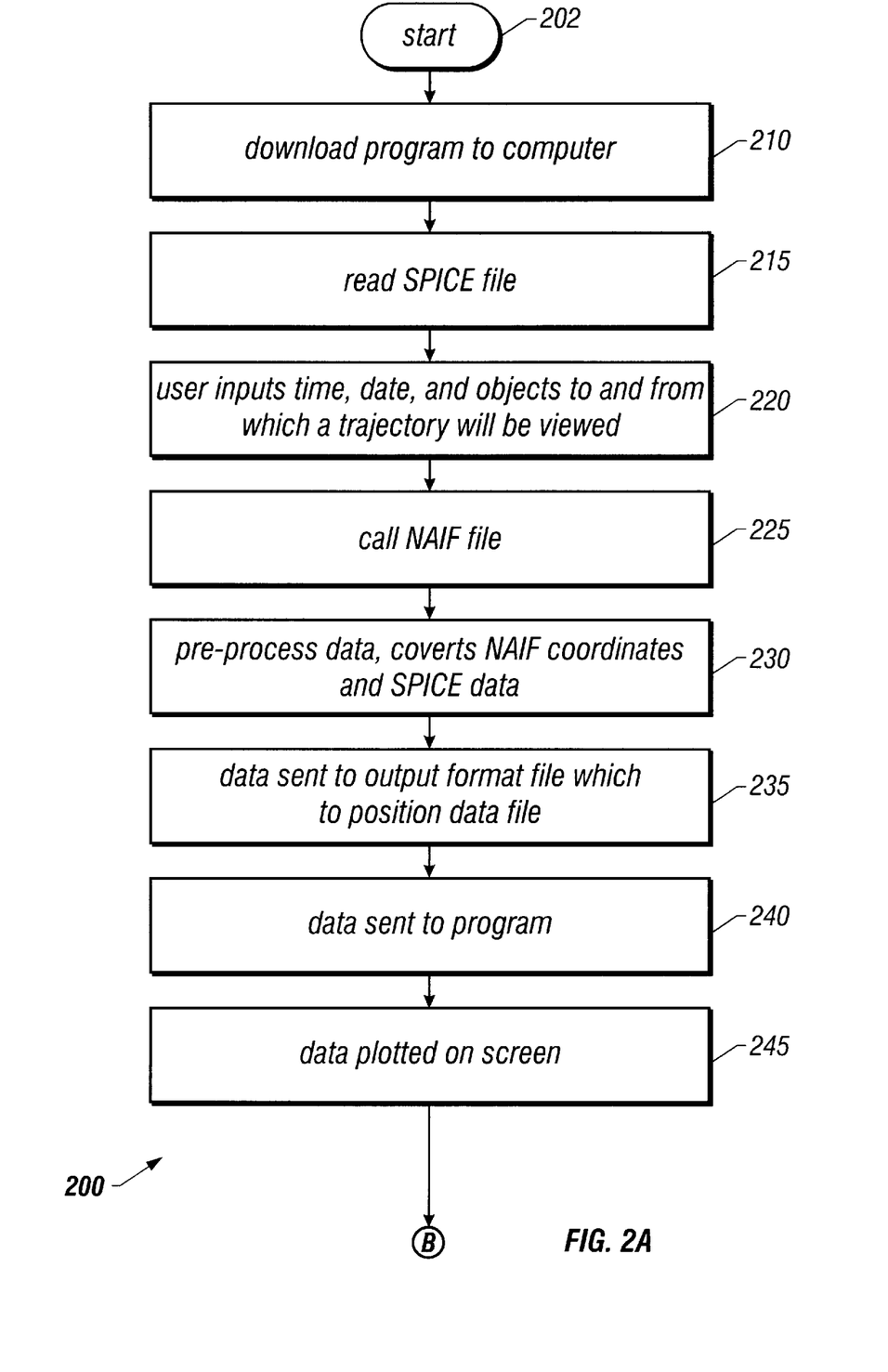
FIG. 2 is a flow diagram showing how the program is implemented in the hardware of FIG. 1.
Figure 2B:
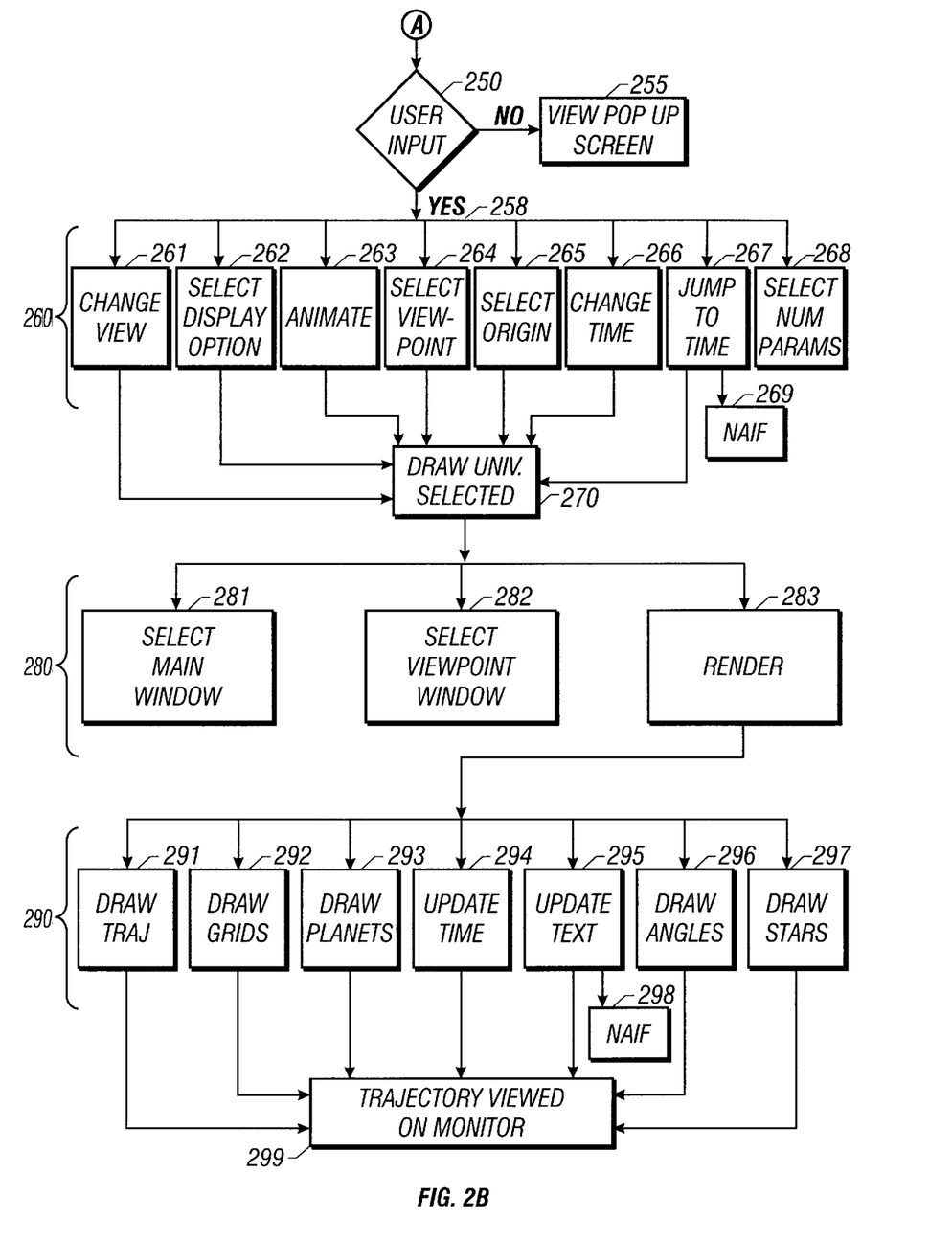

FIGS. 2A and 2B show a high level structure diagram 200 of a program that is implemented in a preferred computer system 100 of FIG. 1. FIG. 2A shows the first part of the program. The process starts at step 202, where the computer system 100 is initialized, and then at step 210, the program is downloaded into the system 100. At step 215, a SPICE file is read into the system 100. The SPICE file includes data which allows the calculations of the positions and velocity of one body (celestial body or spacecraft) with respect to another (the 'center' or origin of the coordinate system), at any time throughout some finite time interval. Either body can be a spacecraft, a planet, a satellite, a comet, an asteroid, or an arbitrary point for which an ephemeris has been calculated. In order to depict the trajectory of a body in the present invention, a SPICE file for that body preferably has the time period over which the trajectory is to be drawn.

At step 220, the user inputs the time and date and select the objects to be viewed. The two objects selected will indicate the launching and landing location of the spacecraft. The SPICE file inputs this data into a preprocess data module.

At step 225, if the preprocess data module is to retrieve the ephemeris data, the Navigation Ancillary Information Facility (NAIF) file having a library of routines to extract data from the SPICE file is called. The SPICE file is accessed using the NAIF functions. The NAIF file allows the present invention to simply extract the position of a body expressed in X,Y,Z coordinates (with some other body as coordinate origin) at a series of predetermined times.

At step 230, the preprocess data module converts the ephemeris data from the SPICE file to X,Y,Z coordinates and time tags. Once converted, the process goes to step 235, where the preprocess data module calls an output format file. The output format file collects the time position data and writes it to a new file called a position data file.

At step 240, the time position data is read into a read data file which stores the data in memory. Finally at step 245, the data is plotted on the screen in three dimensions.

While the data is being stored in memory, several other executions are also occurring. There is a initial GUI module that initializes the main graphics display in the system 100 and a process user input module 40 that reads the input from the user that may be entered via the pop-up menu of the GUI. This now allows the user to view the trajectory information on the GUI.

Referring now to FIG. 2B, at step 250, the user has several options. The user may continue viewing the current screen at step 255 or the user may proceed to step 258 and select any of the viewing options available at step 260. Steps 261–268 allow the user to edit the graphical representation the user is currently viewing. The following is a description of the modules the user has an option to select from.

A change view module 261 changes viewing perspective by translating or rotating along one of the X,Y,Z axes by a single increment. Module 261 will be described in more detail in FIG. 3. a select display option 262 sets/unsets one of the several flags corresponding to a toggle button in the options menu, contained in a select display option 262, that has been selected by the user. The select display option 262 controls whether or not graphical features are displayed, such as grids, stars, spacecraft model, planet textures, angles and distance lines.

An animate module 263 continuously increments the time by a fixed increment and calls a draw universe module 270 (described hereinafter) to show the body positions at the new time. This process works in the background when activated, meaning it is called when no other user input events are pending.

A select viewpoint module 264 sets the current viewpoint to be displayed in the viewpoint window, depending on what pair of toggle buttons in the viewpoint selection window have been selected by the user.

A select origin option 265 changes the origin body of the coordinate system based on what choices are selected by the user from the origin menu. In addition, it loads in new data relative to the selected origin, for later use by the draw universe module 270.

A change time module 266 changes time depicted in display by a single increment (+ or –). The jump to time module 267 accepts a date and time from the user, and at step 269, calls the NAIF file to obtain the positions of all bodies at that time. It then stores this position information in memory for later use by the draw universe module 270.

Figure 3:
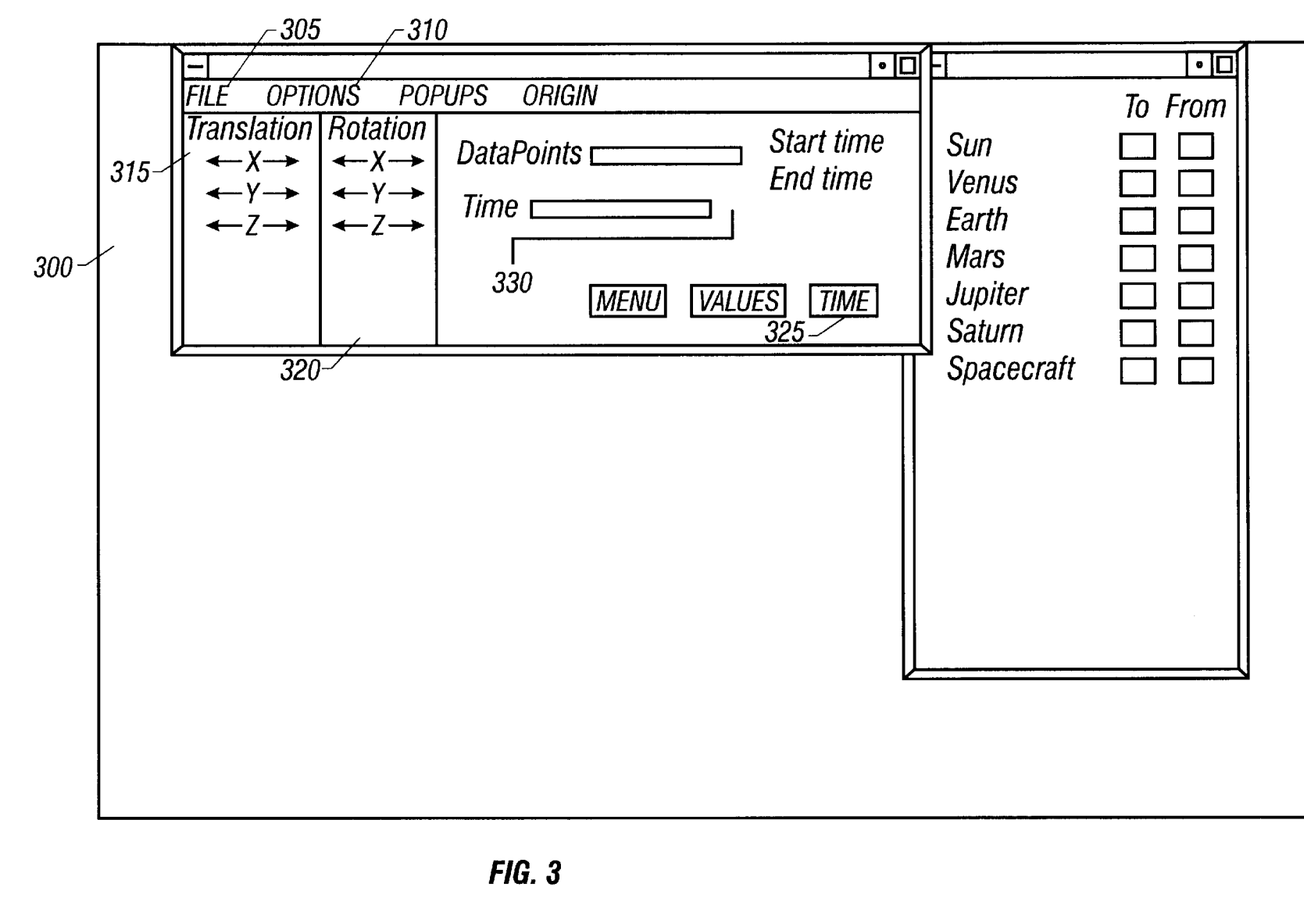
FIG. 3 illustrates a pop-up menu and selection method from which the user may select the objects for display.

A select num parms module 268 sets/unsets one of several flags corresponding to a toggle button in the parameter menu pop-up window 300 of FIG. 3. This controls whether the numeric values of certain parameters are displayed in the parameter value pop-up window 300, such as distance, angle values in degrees or spacecrafts relative velocities.

Modules 261–267 all call on the draw universe module 270 to perform its functions. The draw universe module 270 draws all graphical objects in both the main and viewpoint windows and update all text fields in the GUI, depending on what time is to be displayed. Once the draw universe module 270 draws the objects and updates the fields it may call on any of the following: (I) select main window module 281 that sets up the main graphics window as the current rendering area, (ii) select viewpoint window 282 that sets up the small viewpoint window as the current rendering area or (iii) select render 283 which calls a number of subroutines to draw all the objects in the graphical display that appear automatically or that have been selected by the user. Render 283 also updates all GUI fields and other data fields.

Furthermore, the render module 283 may call on the following modules for functions that draws objects, e.g., trajectories, planets, sun-earth-probe angle. The draw trajectory 291, draw grids 292, draw planets 293, draw angles 296 and draw stars 297 modules all draw objects in the graphic display by calling an openGL primitives file.

In addition to modules that draw objects, the render module 283 may also update time fields and slider widget in the GUI by calling a update time module 294. It may also update all active text fields in the parameters value pop-up window 300 by calling the update text module 295.

At the lowest level of the code are calls to the openGL primitives library, a library of functions callable from C that execute graphics primitives, such as drawing lines and spheres. The GUI is implemented using these X/Motif libraries.

FIG. 3 shows an example of an initial pop-up menu screen 300 displaying the options available to the user. In the present invention, the GUI provides a menu bar allowing the user to select options, and display the spacecraft's trajectory in three dimensions. The menu bar includes a plurality of menu items. For example, a "File" menu entry 305 provides accustomed file management functions, such as save and exit. Furthermore, the "Options" menu entry 310 allows the user to select the various options described in FIG. 2B.

Once the user selects the options, the flow diagram of FIG. 2 is generated and displayed reflecting the steps of the selected configuration. This will now enable the user to view the spacecraft's trajectory in three-dimensions.

Most personal computers include user control apparatuses which enables an user to interact with the computer to provide input information, image manipulation commands pertinent to modifying the image displayed, and output information. Image manipulation commands include the ability to independently control the translation and rotation from which to view the trajectory of the spacecraft.

Figure 6:
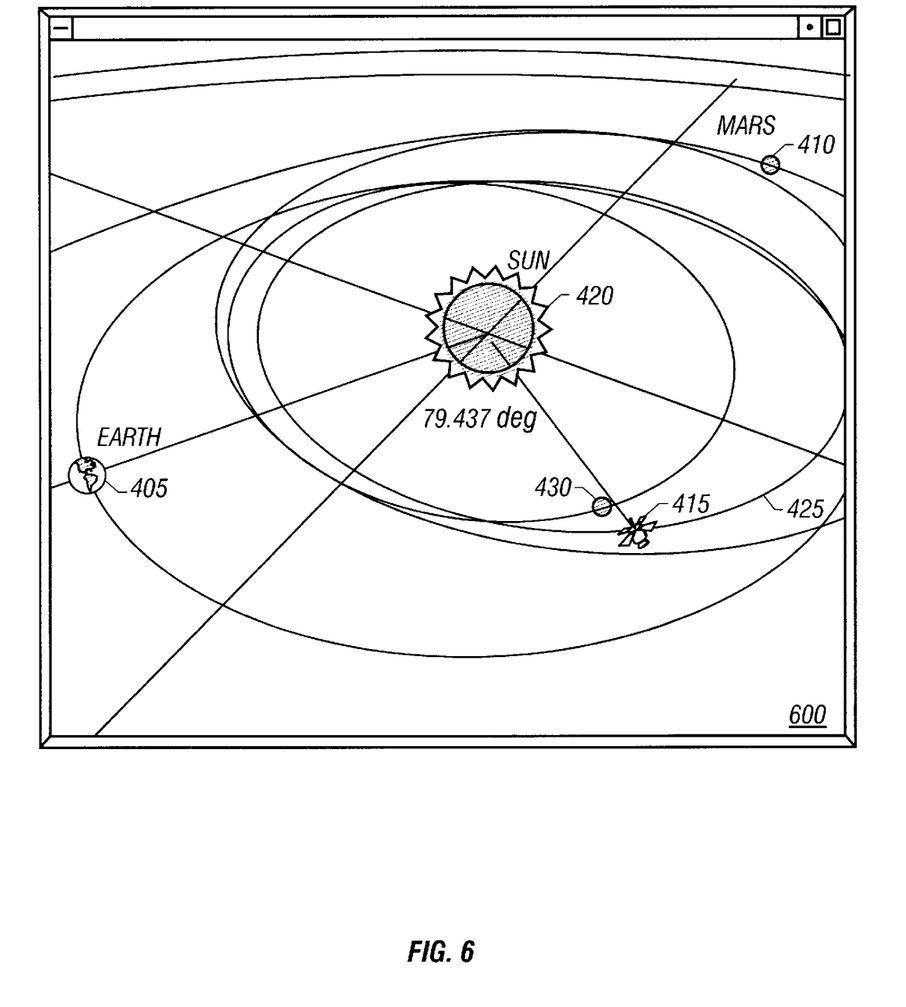
FIG. 6 is yet another graphical representation of a spacecraft's trajectory in three-dimensional space.

The present invention, provides for options for displaying the original data as input into the configuration. However, the user may also translate 315 the degree of freedom along the three orthogonal axis (x, y and z axis) and rotate 320 about the three orthogonal axis (roll, pitch and yaw). In addition to varying the roll, pitch and yaw angles, entering date and time 330, and stepping forwards and backwards in time 325, the user can also perform other functions, including, for example:

point and click on the pop-up menu 300 with the mouse or other pointing device to get vital orbital information, such as the spacecraft's distance from a planet or moon;

display the angles between the Sun, Earth and spacecraft, see FIG. 6; and observe when critical events occur, when occultations or eclipses begin, or when the Sun-Earth-probe angle will reach its maximum or minimum.

A description of a user's perspective of one embodiment of the present invention with reference to an example shown in FIGS. 4–7 may help provide a better understanding of the present invention.

Figure 4:
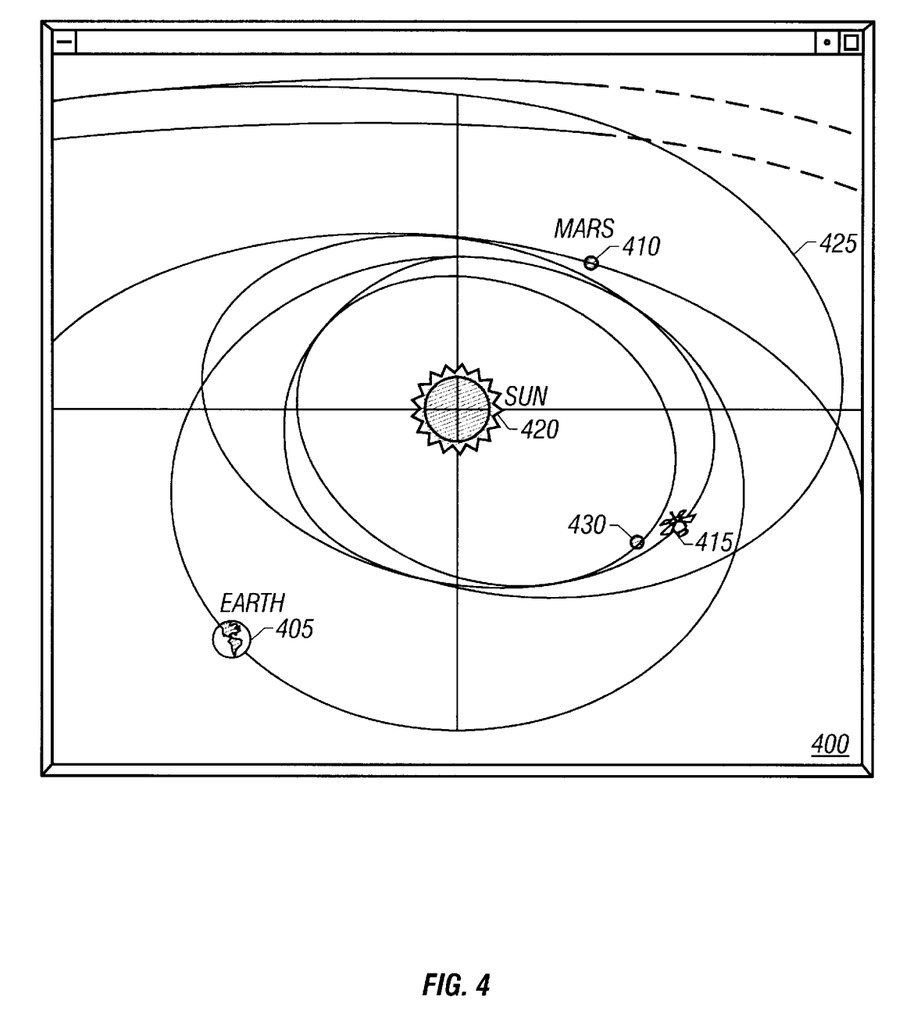
FIG. 4 is a graphical representation of a spacecraft's trajectory in three-dimensional space.
Figure 5:
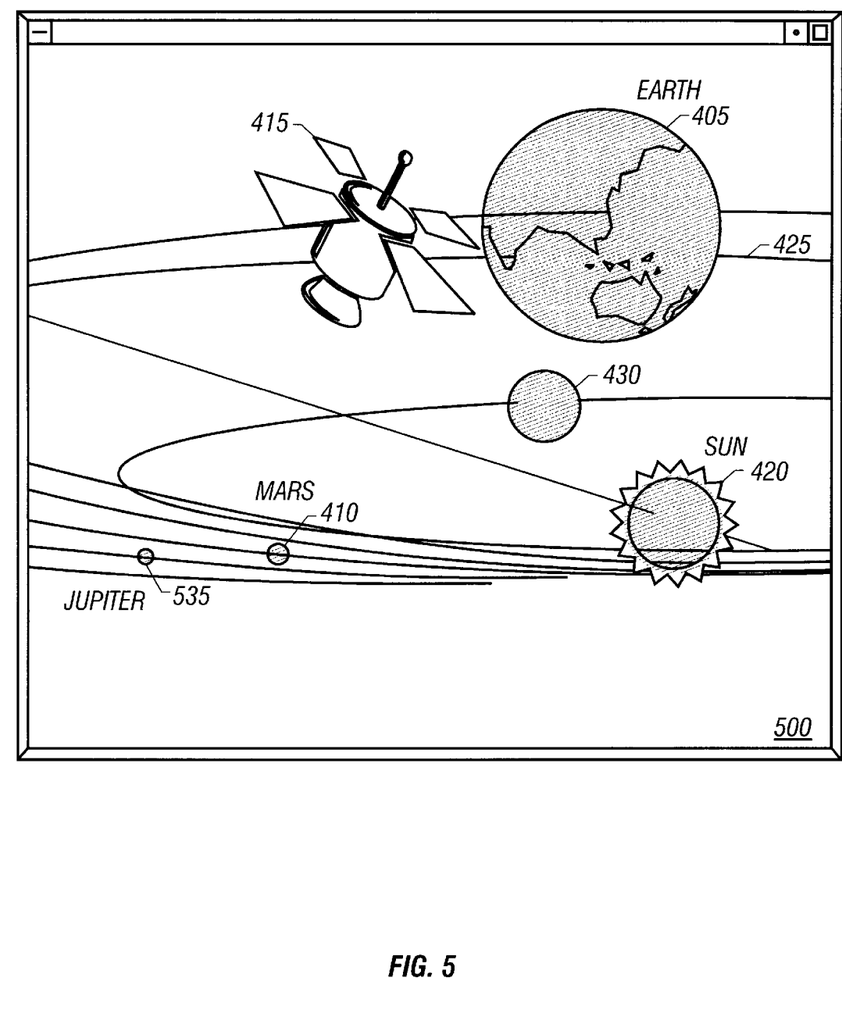
FIG. 5 is another graphical representation of a is spacecraft's trajectory in three-dimensional space.

FIG. 4 illustrates a displayed image of the computer system 100 showing one configuration set for a spacecraft's trajectory. The computer system 100 includes a graphic display 400 on which the celestial sphere, centered at the Sun 420 is projected. The display 400 shows, in addition to the planets 405, 410, 430, the satellite 415 and the Sun 420, a trajectory 425 of the spacecraft 415 as it travels from Earth's 405 orbit to Jupiter's 535 orbit (FIG. 5). The parabolic path 425 of the spacecraft can be viewed by the user in three dimensions.

FIG. 5 illustrates another image that a user may wish to view on the display. This is a close-up view of the satellite 415 as it passes the Earth 405. The satellite 415 is still in Earth's orbit in this drawing.

FIG. 6 displays in three dimensions the satellite's trajectory 425 as it coasts from the orbit of Earth to orbit of Mar's 410. In addition, if the user had selected the display angles 296 option the angle of the objects selected could be viewed.

Figure 7:
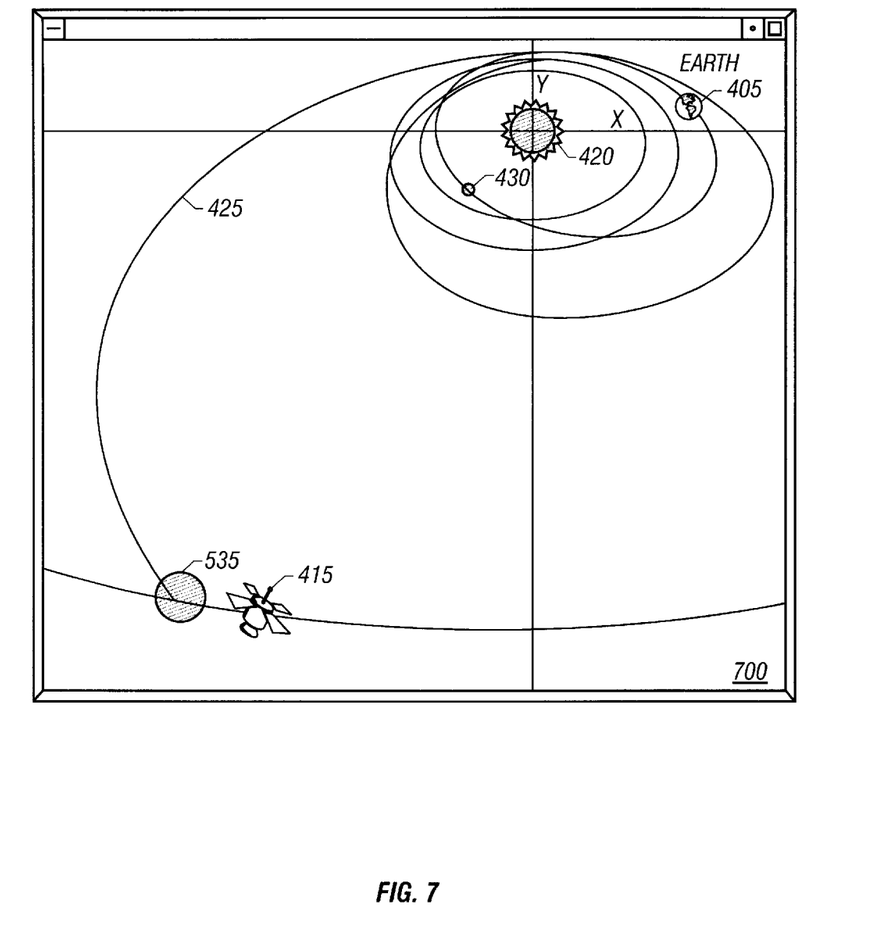
FIG. 7 is yet another graphical representation of a spacecraft's trajectory in three-dimensional space.

FIG. 7 illustrates the satellite 415 reaching its final destination, Jupiter 535. The user can now fully visualize the spacecraft's trajectory 425 as it traveled from Earth 4405 around the Sun 420 to Jupiter 535.

Although the present invention has been described in detail with reference to a preferred embodiment, one ordinarily skilled in the art to which this invention pertains will appreciate that various modifications and enhancements may be made without departing from the scope and spirit of the present invention.

Accordingly, it should be understood that a wide range of changes and modifications can be made to the embodiments described above. It is therefore intended that the foregoing detailed description be illustrative rather than limiting, and that it is the following claims, including all equivalents, which are intended to define the scope of this invention.

What is claimed is:

1. A computer system for processing data of a spacecraft's trajectory, comprising:

first memory means for storing positioning and timing information of said spacecraft and a plurality of celestial bodies including the Earth and Sun;

first data processing means for calculating ephemeris data of said spacecraft and said celestial bodies;

an user interface for entering user option data on said spacecraft's trajectory, said user option data comprising launching location and time and landing location and time of said spacecraft;

graphic processing means for rendering graphic representation of said ephemeris data of said spacecraft and said celestial bodies, said graphic rendition being dictated by said user option data; and a graphic display for displaying said spacecraft's trajectory.

2. A system as in claim 1, further including second memory means for storing pre-calculated orbital data of said spacecraft and said celestial bodies.

3. A system as in claim 1, wherein said first processing means and said graphic processing means operate in combination to allow a three-dimensional graphic representation of said spacecraft's trajectory at any time and position that are included in said positioning and timing information stored in said first memory means.

4. A system as in claim 3, wherein said user interface includes a pointing device and said graphic processing means supports a graphic user interface allowing a user to interact with said graphic representation of said trajectory by using said pointing device.

5. A system as in claim 4, wherein said graphic user interface includes an option to view said spacecraft's trajectory with respect to other celestial bodies including an angle with respect to the Earth and Sun.

6. A system as in claim 4, wherein said graphic user interface includes a plurality of graphic display fields allowing simultaneous viewing of different representations of said spacecraft's trajectory.

7. A system as in claim 4, wherein said graphic user interface includes an option to allow a user to translate and rotate a field of view of said spacecraft's trajectory.

* * * * *